US007353507B2

(12) United States Patent
Gazdik et al.

(10) Patent No.: US 7,353,507 B2
(45) **Date of Patent: *Apr. 1, 2008**

(54) INTERCEPTING FUNCTION CELLS

(75) Inventors: Charles J. Gazdik, Boise, ID (US); Shell Sterling Simpson, Boise, ID (US)

(73) Assignee: Hewlett-Packard Development, L.P., Houston, TX (US)

( * ) Notice: Subject to any disclaimer, the term of this patent is extended or adjusted under 35 U.S.C. 154(b) by 904 days.

This patent is subject to a terminal disclaimer.

(21) Appl. No.: 10/283,695

(22) Filed: Oct. 30, 2002

(65) Prior Publication Data

US 2004/0088684 A1 May 6, 2004

(51) Int. Cl.
*G06F 9/44* (2006.01)
*G06F 9/45* (2006.01)

(52) U.S. Cl. ...................... 717/159; 717/130; 717/133; 717/157; 717/158; 717/169

(58) Field of Classification Search ........ 717/124–167; 719/330; 714/38
See application file for complete search history.

(56) References Cited

U.S. PATENT DOCUMENTS 5,903,718 A * 5/1999 Marik ......................... 714/38
6,199,202 B1 3/2001 Coutant et al.
6,230,312 B1 * 5/2001 Hunt .......................... 717/108
6,263,491 B1 * 7/2001 Hunt .......................... 717/130
6,268,924 B1 7/2001 Koppolu et al.
6,779,187 B1 8/2004 Hammond
2002/0019887 A1 2/2002 Moore
2004/0088676 A1 * 5/2004 Gazdik et al. .............. 717/101
2004/0088683 A1 * 5/2004 Gazdik et al. .............. 717/133
2004/0088719 A1 * 5/2004 Gazdik et al. .............. 719/330
2004/0237071 A1 * 11/2004 Hollander et al. .......... 717/124
2004/0243975 A1 12/2004 Krueger et al.

* cited by examiner

*Primary Examiner*—Chuck Kendall

(57) ABSTRACT

Intercepting function calls. In one embodiment of the application, an import address table for an application is accessed and an address, in the import address table, associated with a function to which calls from the application are to be intercepted is replaced with an address to be used to access a proxy function. In another embodiment, the application is loaded in debugging mode. Once the import address table for the application has been populated with addresses for functions called by the application, the execution of the application is paused. An address, in the import address table, associated with a function to which calls from the application are to be intercepted is replaced with an address to be used to access a proxy function. Execution of the application is then resumed.

17 Claims, 11 Drawing Sheets

34

IAT 38 40 42

| *module* | *function* | *address* |
| --- | --- | --- |
| ONE | | |
| | kick | () |
| TWO | | |
| | pause | () |
| | pitch | () |

36

22A

| | MODULE ONE | | |
|---|---|---|---|
| | *function* | *address* | |
| 44 | pass | 0x100 | 56 |
| 46 | kick | 0x101 | 58 |
| 48 | end | 0x102 | 60 |

22B

| | MODULE TWO | | |
|---|---|---|---|
| | *function* | *address* | |
| 50 | watch | 0x200 | 62 |
| 52 | pause | 0x201 | 64 |
| 54 | pitch | 0x202 | 66 |

34

| | IAT | | |
|---|---|---|---|
| | 38 | 40 | 42 |
| | *module* | *function* | *address* |
| 36 | SPORT | | |
| | | kick | (0x101) |
| | PLAY | | |
| | | pause | (0x201) |
| | | pass | (0x202) |

124A

| IAT | | |
|---|---|---|
| MODULE 1 | | |
| | *function 1.1* | *()* |
| | *function 1.2* | *()* |
| MODULE 2 | | |
| | *function 2.1* | *()* |
| MODULE 3 | | |
| | *function 3.1* | *()* |
| | *function 3.2* | *()* |
| | *function 3.3* | *()* |

| IAT | | |
|---|---|---|
| MODULE 1 | | |
| | *function 1.1* | *(address 1)* |
| | *function 1.2* | *(address 2)* |
| MODULE 2 | | |
| | *function 2.1* | *(address 3)* |
| MODULE 3 | | |
| | *function 3.1* | *(address 4)* |
| | *function 3.2* | *(address 5)* |
| | *function 3.3* | *(address 6)* |

| PROXY MODULE | |
|---|---|
| *proxy function 1.2* | *address 7* |
| *proxy function 3.2* | *address 8* |

| IAT | | |
|---|---|---|
| MODULE 1 | | |
| | *function 1.1* | *(address 1)* |
| | *function 1.2* | *(address 7)* |
| MODULE 2 | | |
| | *function 2.1* | *(address 3)* |
| MODULE 3 | | |
| | *function 3.1* | *(address 4)* |
| | *function 3.2* | *(address 8)* |
| | *function 3.3* | *(address 6)* |

INTERCEPTING FUNCTION CELLS

FIELD OF THE INVENTION

The present invention generally relates to altering the behavior of a computer program, and, more specifically, to intercepting function calls directed to one programming module and redirecting the function call to another programming module.

BACKGROUND

In today's computing environments, applications rely on operating systems to function. Operating systems provide a software platform on top of which applications can run. Operating systems perform basic tasks, such as recognizing input from a keyboard and mouse, sending output to a display screen, keeping track of files and directories on a hard disk drive, and controlling peripheral devices such as printers. Modern operating systems take a modular approach to supporting various applications. For example, a given operating system may make available a number of functions—those functions residing in a series of programming modules. However, a given application may only need a few of those functions. Consequently, programming for all of the functions provided by the operating system need not be loaded into a computer's memory—only the programming for those functions used by the application.

When an application is executed and loaded into a computer's memory, the operating system identifies and also loads into memory each of the operating system's modules that supply functions needed by the application. Such a module might include programming for presenting an interface enabling a user to select a printer and various options for printing a document. All applications compatible with the operating system can call on that module when a user desires to print. Beneficially, the user need only become familiar with a single interface when printing regardless of the application being used.

Like the example of the print interface, many of an operating system's modules supply functions that require user interaction. Often, however, it is desirable for other programming to provide the necessary interaction needed to utilize a given operating system module. For example, a user may desire that programming operating on a server print a document. Where the server is geographically separated from the user, the user is not able to provide the interaction needed to direct the programming on the server to print the document. The user must instead rely on other programming operating on the server to supply the needed interaction. Unfortunately, programming designed to mimic human interaction is often cumbersome and unreliable.

This problem reveals a need for a method for intercepting a function call to a module that collects data provided through a user interface redirecting the function call to a module that collects the data programmatically. However, the same techniques used to achieve this goal can be used for a variety of other purposes.

SUMMARY

Accordingly, embodiments of the present invention operate to intercept a function call directed to one module and to redirect that function call to another module providing desired function or functions. In one embodiment of the application, an import address table for an application is accessed and an address, in the import address table, associated with a function to which calls from the application are to be intercepted is replaced with an address to be used to access a proxy function. In another embodiment, the application is loaded in debugging mode. Once the import address table for the application has been populated with addresses for functions called by the application, the execution of the application is paused. An address, in the import address table, associated with a function to which calls from the application are to be intercepted is replaced with an address to be used to access a proxy function. Execution of the application is then resumed.

DESCRIPTION OF THE DRAWINGS

FIGS. 12-19 are block diagrams illustrating the contents of the operational memory of FIG. 9 as the steps described in FIG. 11 are executed according to an embodiment of the present invention.

DETAILED DESCRIPTION

INTRODUCTION: Modern operating systems take a modular approach to supporting various applications. For example, a given operating system may make available a number of functions—those functions residing in a series of programming modules. However, a given application may only need a few of those functions. Consequently, programming for all of the functions provided by the operating system need not be loaded into a computer's memory—only the programming for those functions used by the application.

In the description that follows, the steps taken to execute a computer application will be described with reference to FIGS. 1-8. The environment in which various embodiments of the present invention may be implemented is described with reference to FIGS. 9 and 10. Steps taken to practice an embodiment of the present invention are then described with reference to FIG. 11. Finally, an example of one particular implementation of an embodiment of the present invention is described with reference to FIGS. 12-19.

Figure 1:
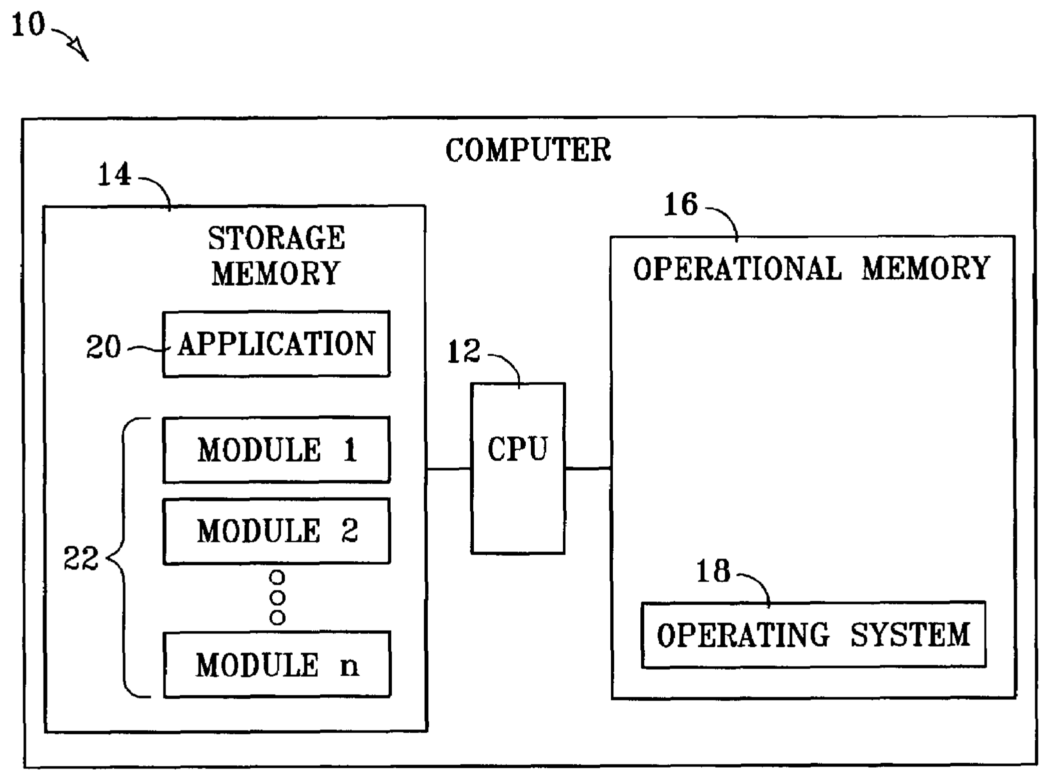
FIG. 1 is a block diagram illustrating the physical and logical components of a computer system.

APPLICATION EXECUTION: FIG. 1 is a block diagram illustrating some physical and logical components of a computer 10. Computer 10 includes CPU 12 (Central Processing Unit), storage memory 14, and operational memory 16. CPU 12 represents generally any processor capable of executing computer programs. Storage represents generally any memory designated to store programs and other data when not being used by CPU 12. Typically, storage memory 14 is non-volatile memory able to retain its contents when computer 10 is switched off. Examples include hard disk drives, flash memory, and floppy disks. Operational memory 16 represents generally any memory designated to contain programs and data when in use by CPU 12. Typically, operational memory 16 is volatile memory which loses its contents when computer 12 is switched off. An example of operational memory 16 is RAM (Random Access Memory).

FIG. 1 illustrates computer 10 with only operating system 18 loaded into operational memory 16. Storage memory 14 contains application 20 and a series of modules 22. Application 20 represents generally any computer program application. Modules 22 represent generally any programming providing functions that may or may not be needed by application 20.

Figure 2:
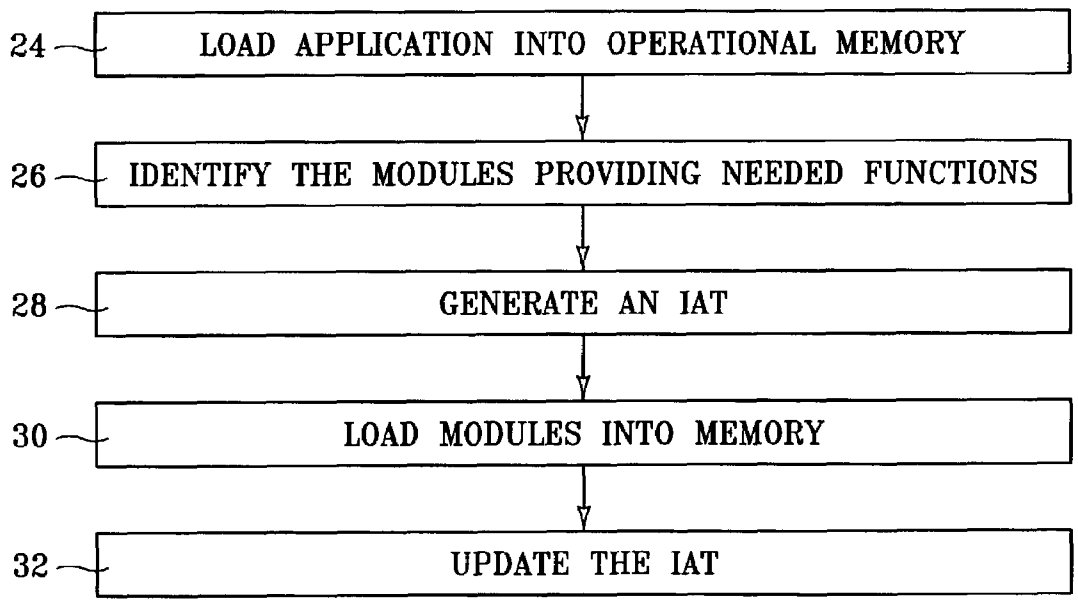
FIG. 2 is flow diagram illustrating steps taken to load an application and required modules into operational memory.
Figures 3, 4:
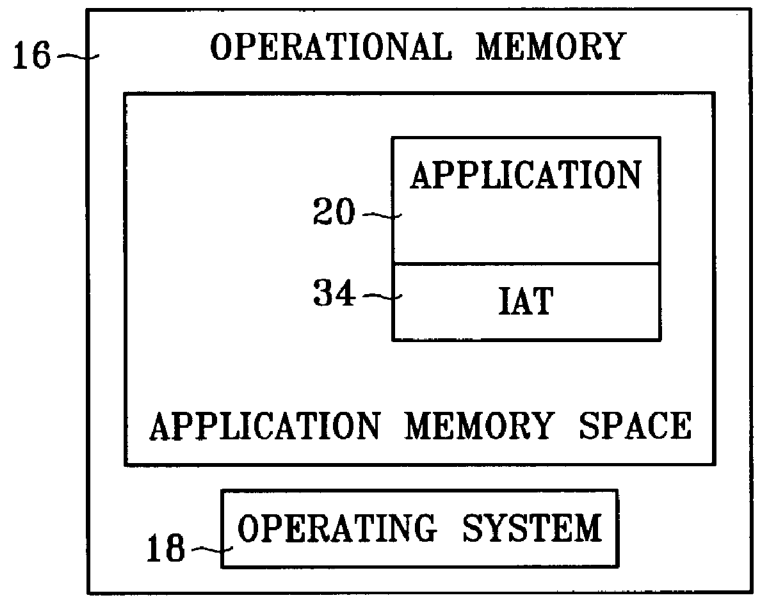
FIGS. 3-8 are block diagrams illustrating the contents of the operational memory of FIG. 2 as the steps described in FIG. 2 are executed.
Figures 5, 6, 7, 8:
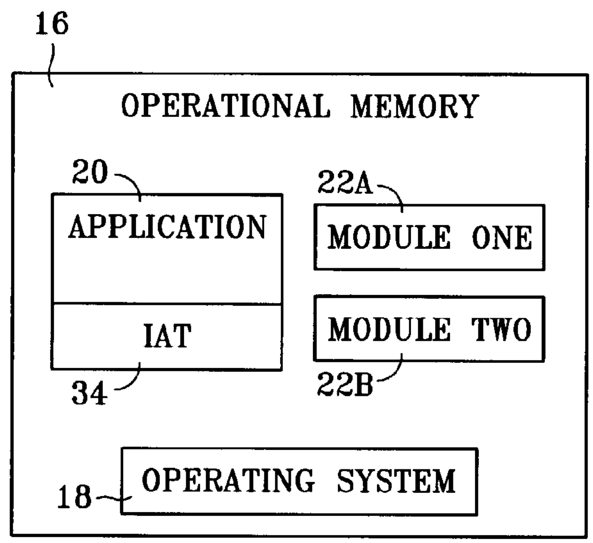

The steps take to execute application 20 using an operating system such as Microsoft Windows® will be described with reference to FIG. 2. FIGS. 3-5 help to illustrate the contents of operational memory as the steps of FIG. 2 are carried out. Operating system 18 accesses storage memory 14, locates application 20, and loads application 20 into operational memory 16 (step 24). Application 20 includes an IAT (Import Address Table). The IAT is an array used by application 20 to identify the memory address of the modules used by application 20. The IAT, when functional, associates a unique memory address with a name identifying one or more functions provided by each identified module. However, as the identified modules have not yet been loaded into operational memory 16, the IAT, at this point, contains the names of the identified modules and the relevant functions provided by each. It does not contain addresses. Below, this is illustrated by example with reference to FIGS. 3-5.

Operating system 18 identifies those modules 22 that provide functions needed by application 20 (step 26). Operating system 18 loads the modules 22 identified in step 26 into operational memory 16 (step 30). Now, operating system 18 identifies the memory addresses of the functions provided by each of the loaded modules 22 and updates the IAT rendering the IAT functional (step 32). Operating system 18 now executes application 20. When application 20 needs to make a call to a function supplied by a module 22, the address of that function can be identified in the IAT.

FIG. 3 illustrates the contents of operational memory 16 following step 28 in which operating system generates the IAT—referenced as IAT 34. FIG. 4 shows the contents of IAT 34 in more detail. Operational memory 16 contains application 20 with its IAT 34. IAT 34 includes a series of entries 36— separate entries referencing each module 22 application 20 needs to operate and separate entries referencing each function provided by those modules 22 and called by application 20. Each entry 36 includes a module field 38, a function field 40, and an address field 42. For each entry 36 referencing a module 22, the module field 38 contains a name identifying that module 22. For each entry 36 identifying a function, the function field 40 contains a name identifying that function. In the example of FIG. 3, application 20 needed modules one and two to operate.

The address fields 42 are empty at this point as the modules 22 needed by application 20 to operate have not been loaded. Within module one, application calls a function labeled "kick." Within Module two, application 20 calls functions labeled "pause" and "pitch." Modules one and two may provide other functions, but only those listed in IAT 34 are needed by application 20.

FIG. 5 illustrates the contents of operational memory 16 following step 30 in which operating system 18 loads the modules needed by application 20 into operational memory 16. The needed modules are labeled module one 22A and module two 22B and are illustrated in more detail in FIGS. 6 and 7 respectively. Module one 22A contains programming providing functions labeled pass 44, kick 46, and end 48. Module two 22B contains programming providing functions labeled watch 50, pause 52, and pitch 54. The programming for each function has been loaded into one of a series of memory addresses 56-66 and 62-66 for modules one and two, respectively.

FIG. 8 illustrates the contents of IAT 34 following step 30 in which operating system 18 updates IAT 34. IAT 34 now contains addresses for the kick, pause, and pass functions. When application 20 needs to make a call to any of those functions at any time, application 20 or operating system 18 can access IAT 34 to identify the address for that function.

Figure 9:
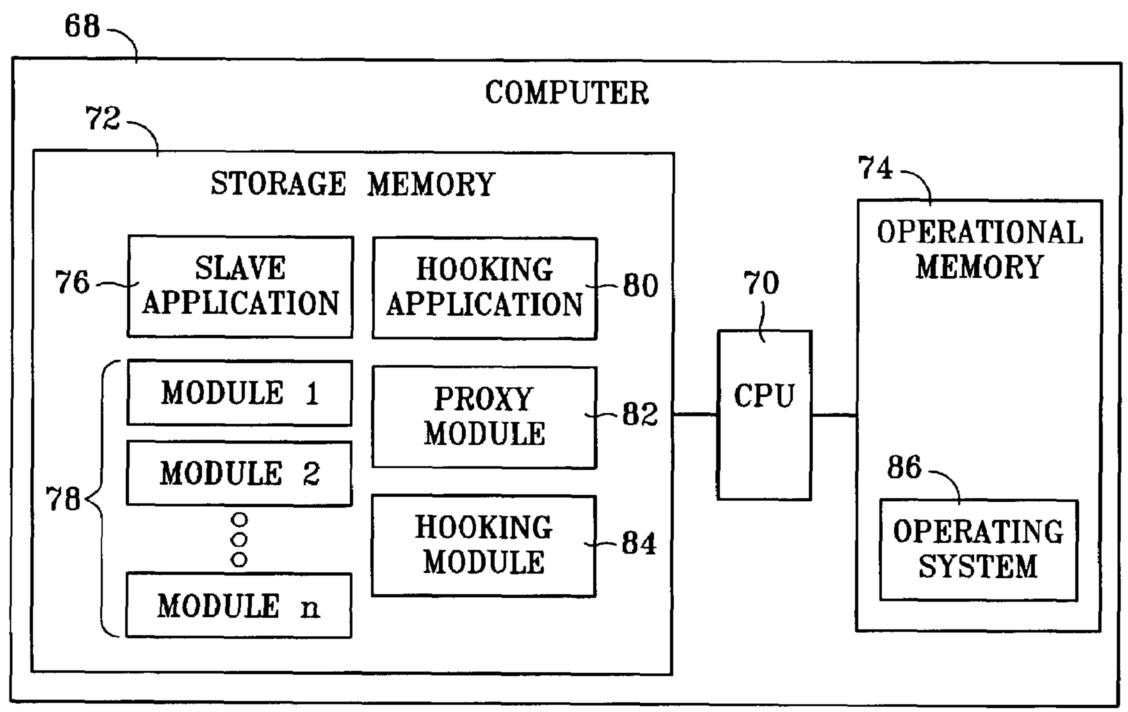
FIG. 9 is a block diagram illustrating a computing environment in which various embodiments of the present invention may be implemented.

ENVIRONMENT: FIG. 9 is a block diagram illustrating computer 68 which provides an environment in which various embodiments of the present invention may be implemented. Computer 68 includes CPU 70, storage memory 72, and operational memory 74. Storage memory 72 contains slave application 76, slave modules 78, hooking application 80, proxy module 82, and hooking module 84. CPU 70 represents generally any processor capable of executing slave and hooking applications 76 and 80. Operational memory 74 includes operating system 98 which represents generally any programming capable of loading applications 76 and 80 as well as modules 82 and 84 into operational memory 74 allowing applications 76 and 80 to be executed by CPU 70.

Slave application 76 represents generally any programming serving a function on computer 68. Each slave module 78 represents generally any programming supplying a function or functions needed by slave application 68 to operate. Hooking application 80 represents generally any programming capable of altering, in a manner described below, slave application 76 after slave application 76 has been loaded into operational memory 74. As CPU 70 executes slave application 76, the alterations caused by hooking application 80 cause calls from slave application 76 to a function or functions provided by one or more slave modules 78 to be redirected to functions provided by proxy module 82. Proxy module 82, then, represents generally any programming providing functions to replace functions normally provided by one or more slave modules 78. Hooking module 84 represents generally any programming providing functions needed by hooking application 80. While hooking module 84 is illustrated as a single module, the functions it provides may instead be provided by two or more modules.

Figure 10:
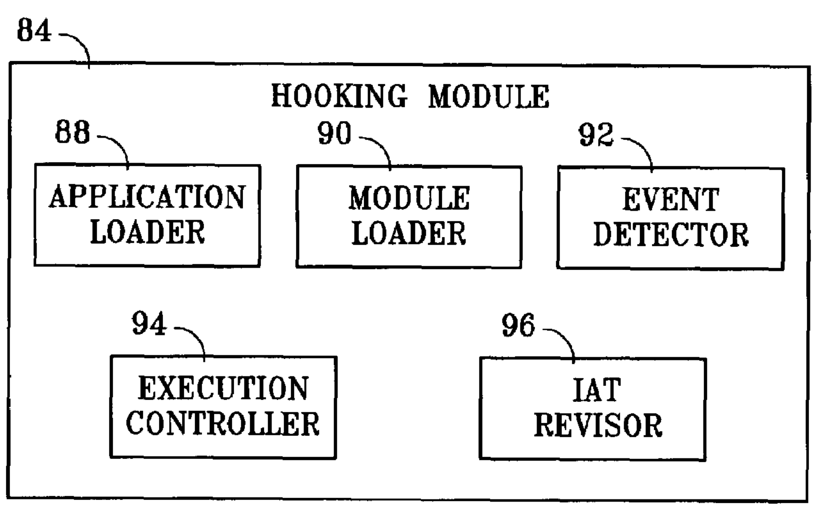
FIG. 10 is a block diagram illustrating the logical programming elements of a hooking module according to one embodiment of the present invention.

FIG. 10 illustrates the logical programming elements of hooking module 84. These include application loader 88, module loader 90, event detector 92, execution controller 94, and IAT reviser 96. Application loader 88 represents generally any programming capable of loading slave application 76 into a memory space reserved for slave application 76 within operational memory 74 and then initiating slave application 76 in debugging mode. (Generally, debugged applications are loaded into their own address space—not the address space of the slave debugging application. The preceding statement should be revised to address this.) A memory space is a portion of operational memory 74 reserved for a particular application and any modules it may need to operate. Each application loaded into operational memory 74 is loaded into its own unique memory space. Generally, only the application is capable of reading or modifying the memory in its address space. Reserving a unique memory space for each application helps to prevent the operation of one application from interfering with the operation of another. Typically address spaces are implemented using virtual memory.

In debugging mode, slave application 76 operates normally except hooking application 80 retains control over certain aspects of slave application 76. For example, hooking application 80 can pause and resume execution of slave application 76 upon detection of certain events. Debugging mode is normally used by program development tools to enable the diagnosis of problems in newly developed programs. Generally, operating systems provide the following capabilities to the debugging application: reading the memory of the debugged application; writing the memory of the debugged application; receiving the notification of when the breakpoint instruction is executed by the debugged application; pausing the execution of the application; resuming the execution of the application; and, terminating the execution of the application. Execution of a breakpoint instruction causes program execution to halt and a notification to be sent. Typically, the debugging application will replace certain instructions of the debugged application with breakpoint instructions in order to cause the debugged application to halt execution at particular points during the execution of the debugged application. When the debugged application halts execution, the debugging application can then examine the state of the application to diagnose any problems with the debugged application.

Module loader 90 represents generally any programming capable of loading, directly or indirectly, proxy module 82 into the memory space of slave application 76. Event detector 92 represents any programming capable of detecting one or more events in the execution of slave application 76. An example of such an event includes the occurrence of when slave application 76 has been loaded into operation memory 74 and its IAT includes the addresses of the functions provided by modules 78 that it needs to operate. Execution controller 94 represents generally any programming operable to pause and resume the execution of slave application 76. IAT reviser 96 represents any programming capable of replacing, in the import address table for slave application 76, an address used to access a function provided by a slave module 78 with an address used to access a proxy function provided by proxy module 82.

OPERATION: The steps taken to execute applications 76 and 80 will be described with reference to FIG. 11 Initially, hooking application 80 is initiated providing any necessary parameters such as data identifying slave application 76 and proxy module 82 (step 98). In response, operating system 86 reserves a memory space in operational memory 74 for hooking application 80 loading hooking application 80, proxy module 82, and hooking module 84 into that memory space (step 100).

When executed by CPU 70, hooking application 80 initiates slave application 76 in debugging mode (step 102). Operating system 86, then, reserves a memory space in operational memory 74 for slave application 76 loading slave application 76 into that memory space (step 104). As with the description above made with reference to FIGS. 2-5, slave application 76 includes an IAT making references to functions provided by slave modules 78. Operating system 86 loads slave modules 78 into the slave application's memory space. Operating system 86 updates the IAT to contain the addresses for those functions provided by the loaded slave modules 78 needed by slave application 76. Hooking application 80 detects when slave application 76 has been loaded and its IAT has been updated (step 106) and pauses the execution of slave application 76 (step 108).

Proxy module 82 is loaded into the memory space for slave application 76 (step 110). To do so hooking application 80 reserves a memory chunk within the memory space for slave application 76. Hooking application 80 loads "bootstrap code" into the reserved memory chunk. Bootstrap code represents generally any programming capable of loading proxy module 82 into the memory space of slave application 76 and to make a call to a function or functions used by slave application 76. Hooking application 76 modifies the IAT for slave application 76 so that an address for a function called early in the execution of slave application 76 is replaced with an address pointing to the bootstrap code. When slave application 76 is started, it makes a call the function using the address in the IAT. Because the address has been changed, the call is routed to the bootstrap code. The bootstrap code loads proxy module 82 into the memory space of slave application 76. In order to preserve the expected behavior of slave application 76, the bootstrap code then makes a call to the function slave application 76 would have called had its IAT not been modified to include the address for the bootstrap code.

Hooking application 80 revises the IAT for slave application 76 replacing addresses pointing to one or more functions provided by one or more loaded slave modules 78 with addresses pointing to one or more functions provided by proxy module 82 loaded in the memory space for slave application 76 (step 114). Hooking application 80 then resumes the execution of slave application 76 (step 116).

Figure 11:
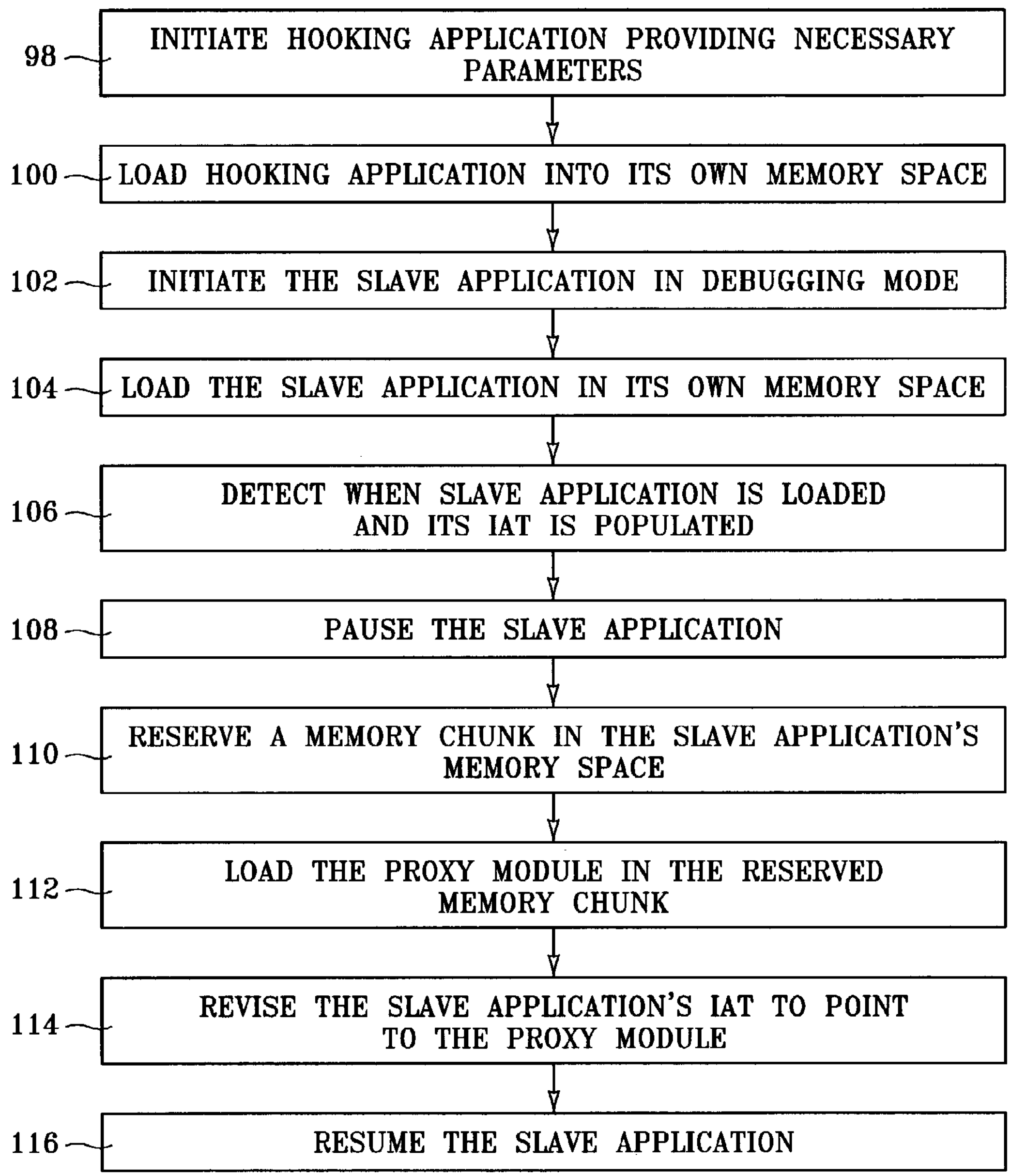
FIG. 11 is a flow diagram illustrating a method in which function calls are intercepted and redirected according to an embodiment of the present invention.

Although the flow chart of FIG. 11 shows a specific order of execution, the order of execution may differ from that which is depicted. For example, the order of execution of two or more blocks may be scrambled relative to the order shown. Also, two or more blocks shown in succession in FIG. 11 may be executed concurrently or with partial concurrence. All such variations are within the scope of the present invention.

Figure 12:
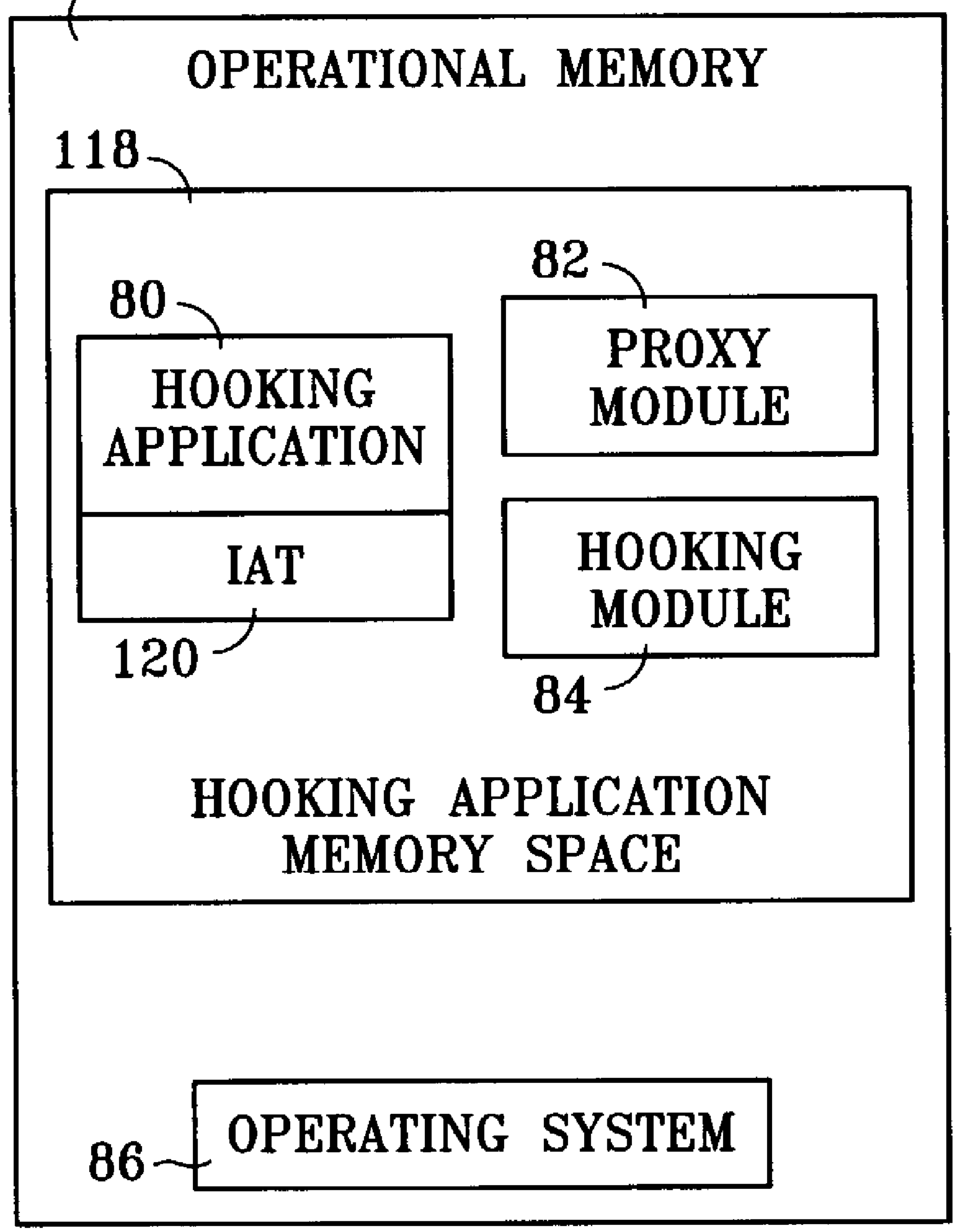

EXAMPLE: FIGS. 12-20 provide examples that help to illustrate the contents of operational memory 74 as the steps of FIG. 11 are carried out. FIG. 12 illustrates operational memory 74 following step 100. Prior to loading hooking application 80 in operational memory 74, operating system 86 reserved memory space 118. Following step 100, memory space 118 contains hooking application 80, proxy module 82, and IAT 120 for hooking application 80.

Figures 13, 14:
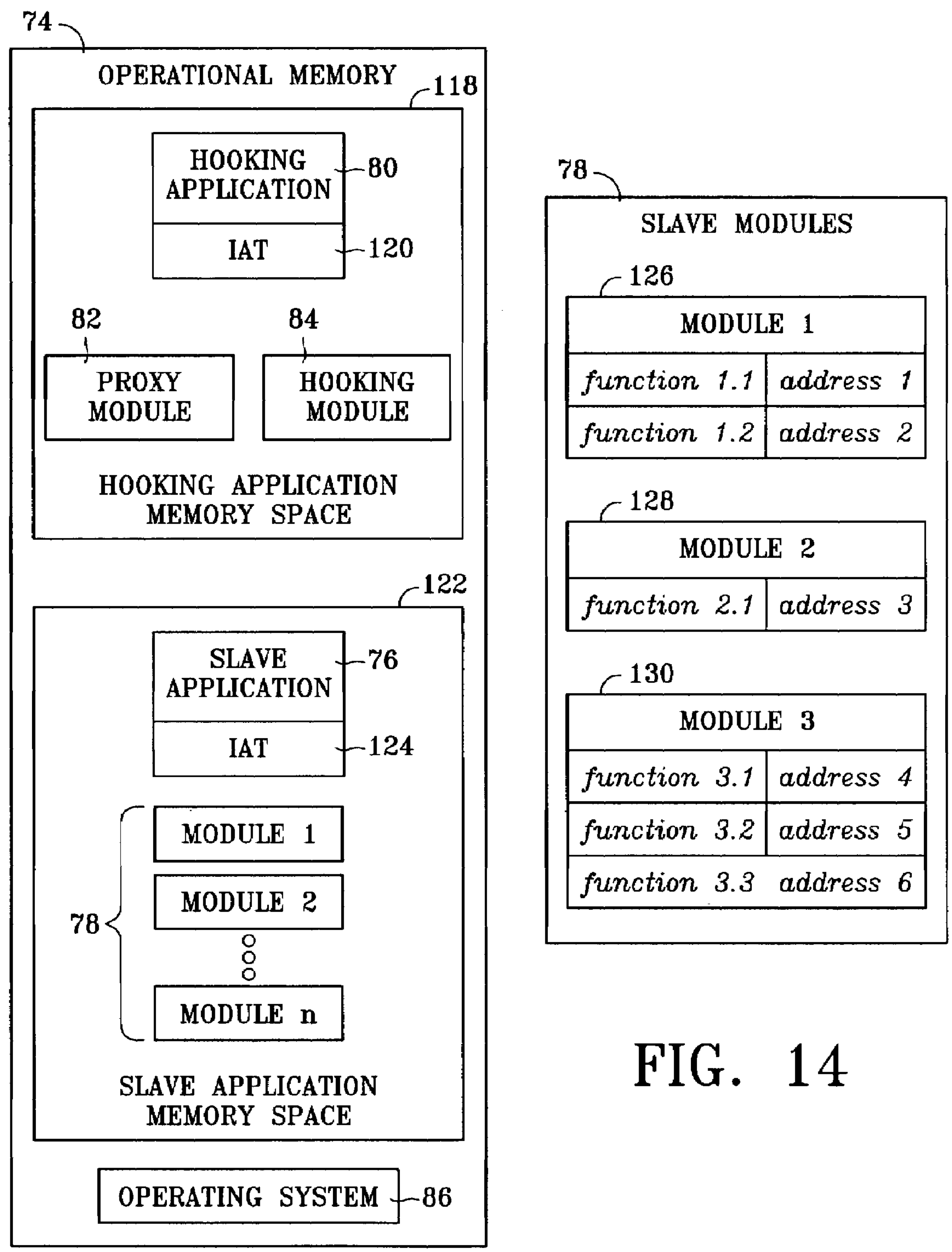

FIG. 13 illustrates operational memory 74 following step 104. Prior to loading slave application 76, operating system 86 reserved memory space 122. In step 104, operating system 86 at the direction of hooking application 80 loaded slave application 76 into memory space 122. Operating system 86 loaded slave modules 78 referenced in IAT 124 for slave application 76. In the example of FIG. 14, slave modules 78 are listed as module one 126, module two 128, and module three 130. However, any number of modules may have been loaded in step 102. Module one 126, in this example, provides programming for two functions—function 1.1 accessible at address one and function 1.2 accessible at address two. Module two 128 contains programming for a single functions—function 2.1 accessible at address three. Module three 130 contains programming for three functions—function 3.1 accessible at address four, function 3.2 accessible at address five, and function 3.3 at address six.

FIG. 15 illustrates IAT 124 before it is updated by operating system 86. FIG. 16 illustrates IAT 124 after it is updated by operating system 86. The before version, referenced as 124A, contains entries 132 for each slave module 78 used by slave application 76 and entries 134 for each function provided by slave modules 78 and called by slave application 76. IAT 124A, however does not contain addresses in entries 134. The after version, referenced as 124B, however, does contain addresses for the functions called by slave application 76.

Figure 17:
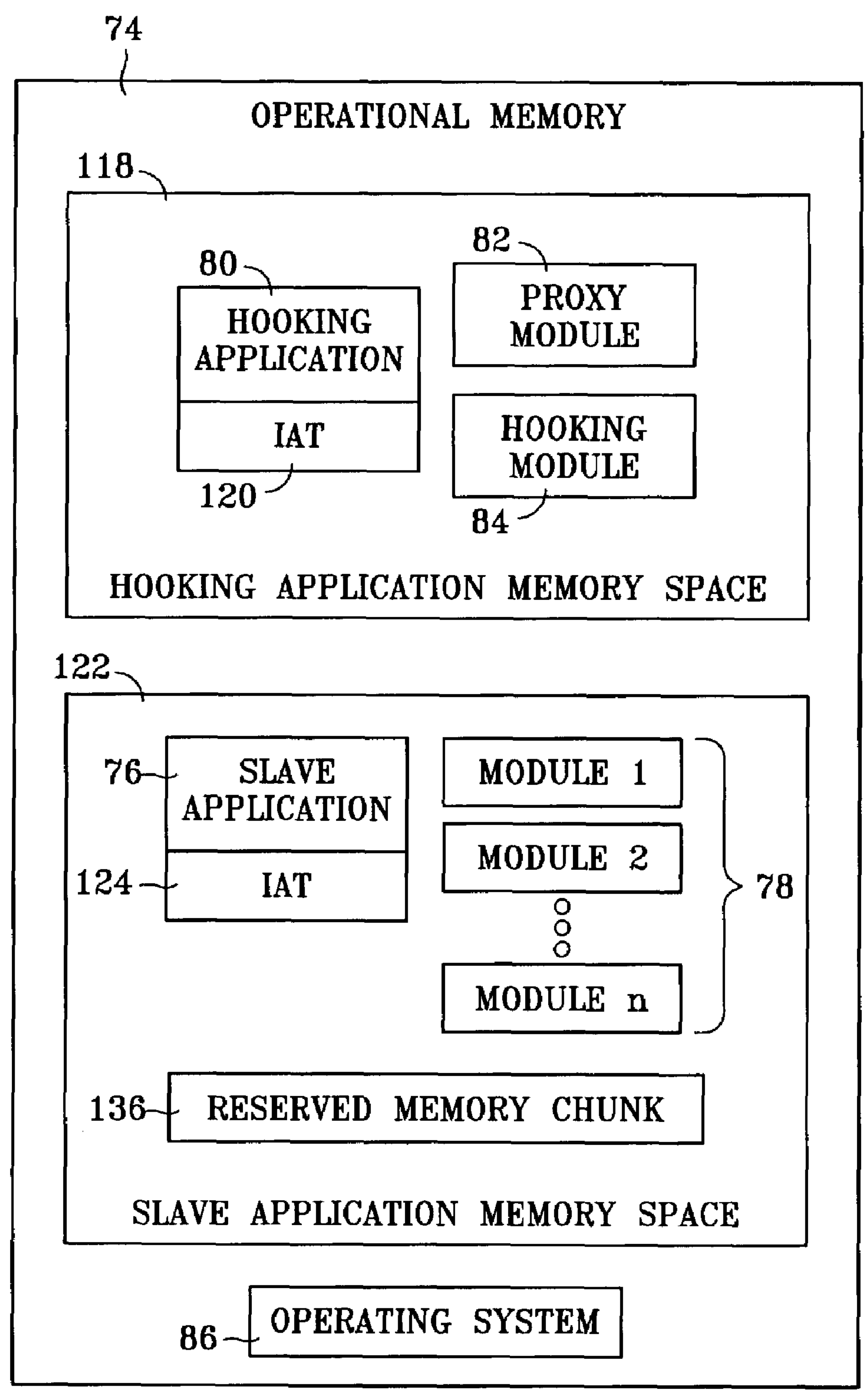
Figure 18:
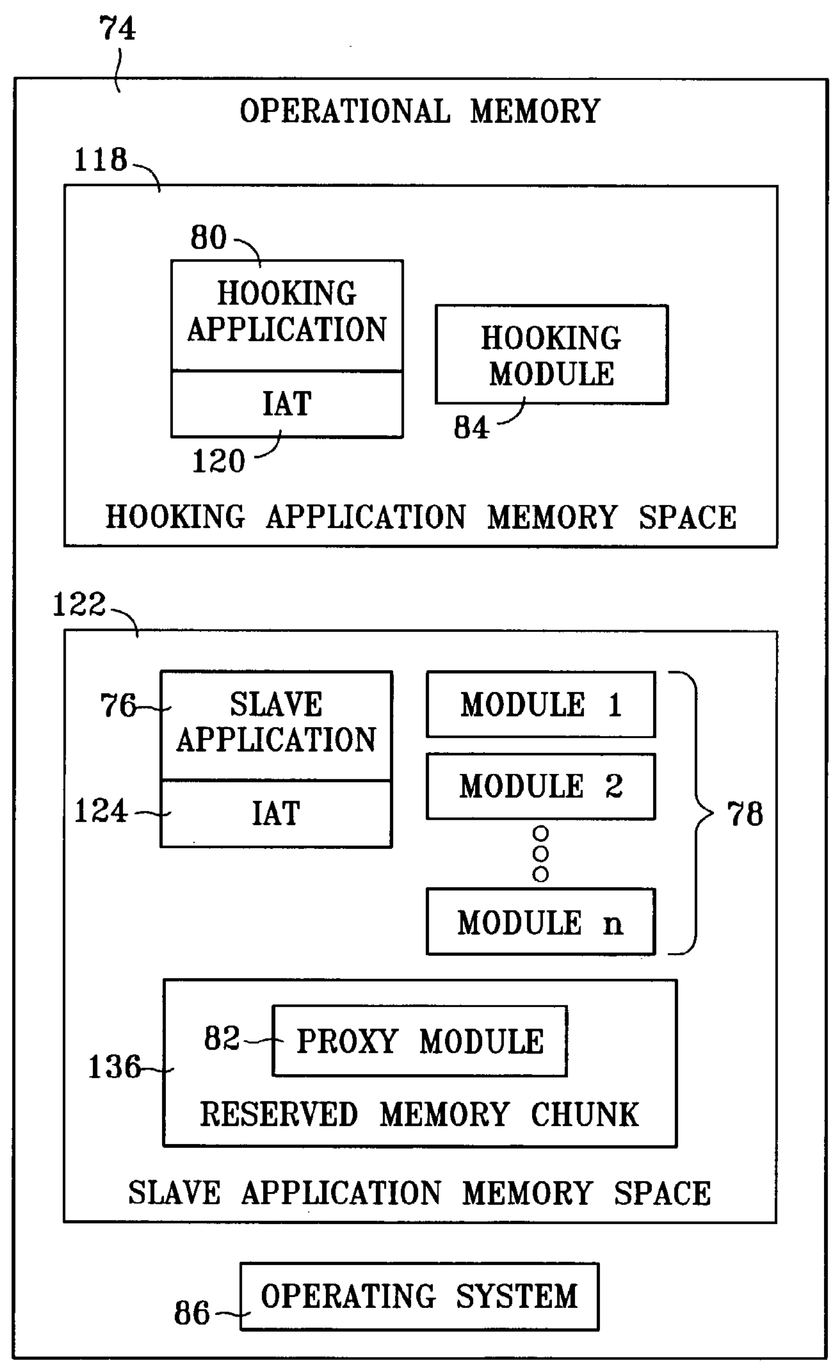

FIG. 17 illustrates operational memory 74 following step 110 in which hooking application 80 loaded proxy module 82 into slave application memory space 122. FIG. 18 illustrates proxy module 82 in more detail. In this example, proxy module provides two functions—proxy function 1.2 accessed at address seven and proxy function 3.2 accessed at address eight.

FIG. 19 shows IAT 124 after it is revised by hooking application 80. In the after version, referenced as 124C, the address for function 1.2 has been replaced with address seven—the address for accessing proxy function 1.2. The address for function 3.2 has been replaced with address 8—the address for accessing proxy function 3.2.

Following step 116, when the execution of slave application 76 is resumed and slave application 76 makes calls to functions 1.2 and 3.2, those calls are redirected to proxy functions 1.2 and 3.2 accordingly. However, as the programming for slave application 76 has not been altered, the redirection is transparent to slave application 76. It is important to note, that while in the examples illustrated in FIGS. 8-13 two function calls were redirected—functions 1.2 and 3.2 redirected to proxy functions 1.2 and 3.2, any number of function calls can be redirected. It should also be noted that proxy functions 1.2 and 3.2 can in turn call the original functions 1.2 and 3.2, as desired since they have not been modified and are available to be called.

The present invention can be embodied in any computer-readable medium for use by or in connection with an instruction execution system such as a computer/processor based system or other system that can fetch or obtain the logic from the computer-readable medium and execute the instructions contained therein. A "computer-readable medium" can be any medium that can contain, store, or maintain programming for use by or in connection with the instruction execution system. The computer readable medium can comprise any one of many physical media such as, for example, electronic, magnetic, optical, electromagnetic, infrared, or semiconductor media. More specific examples of a suitable computer-readable medium would include, but are not limited to, a portable magnetic computer diskette such as a floppy diskette or hard drive, a random access memory (RAM), a read-only memory (ROM), an erasable programmable read-only memory, or a portable compact disc.

The present invention has been shown and described with reference to the foregoing exemplary embodiments. It is to be understood, however, that other forms, details, and embodiments may be made without departing from the spirit and scope of the invention, which is defined in the following claims.

What is claimed is:

1. A method for intercepting a function call from an application, comprising:

loading a bootstrap code into the memory space of the application;

accessing the application's import address table;

replacing, in the import address table, an address used to access a function called early in the execution of the application with an address used to access the bootstrap code;

replacing an address in the import address table used to access a function provided by a slave module with an address to be used to access a proxy function provided by a proxy module;

wherein the bootstrap code includes instructions for loading the proxy module into the memory space of the application and to make a call to the function called early in the execution of the application.

2. The method of claim 1, further comprising identifying in the import address table a function to which calls from the application are to be intercepted, and wherein replacing comprises replacing, in the import address table, an address associated with the identified function with an address to be used to access a proxy function provided by a proxy module.

3. The method of claim 1, further comprising:

loading the proxy module into operational memory;

identifying the address to be used to access the function provided by the proxy module;

identifying in the import address table a function to which calls from the application are to be intercepted; and wherein replacing comprises replacing, in the import address table, an address associated with the identified function with the identified address to be used to access the function provided by the proxy module.

4. A method for intercepting a function call from an application, comprising:

loading the application in debugging mode;

detecting when the application's import address table has been updated to include addresses for functions provided by the slave module and then pausing the execution of the application;

replacing an address in the import address table used to access a function provided by a slave module with an address to be used to access a proxy function provided by a proxy module; and resuming execution of the application after the address for the function provided by the slave module has been replaced.

5. The method of claim 4, wherein loading, detecting, and pausing comprise loading the application in debugging mode with an option selected to automatically pause the execution of the application once the import address table includes addresses for functions provided by the slave module.

6. The method of claim 4, further comprising:

loading the proxy module into the memory space of the application;

identifying the address to be used to access the proxy function provided by the loaded proxy module;

identifying in the import address table a function to which calls from the application are to be intercepted; and wherein replacing comprises replacing, in the import address table, an address associated with the identified function with the identified address to be used to access the function provided by the proxy module.

7. The method of claim 6, wherein loading comprises:

loading a bootstrap code into the memory space of the application; and, replacing, in the import address table, an address used to access a function called early in the execution of the application with an address used to access the bootstrap code;

wherein the bootstrap code includes instructions for loading the proxy module into the memory space of the application and to make a call to the function called early in the execution of the application.

8. Computer readable media having instructions for:

loading a bootstrap code into the memory space of an application;

accessing the application's import address table;

replacing, in the import address table, an address used to access a function called early in the execution of the application with an address used to access the bootstrap code;

replacing an address in the import address table used to access a function provided by a slave module with an address to be used to access a proxy function provided by a proxy module;

wherein the bootstrap code includes instructions for loading the proxy module into the memory space of the application and to make a call to the function called early in the execution of the application.

9. The media of claim 8, having further instructions for identifying in the import address table a function to which calls from the application are to be intercepted, and wherein the instructions for replacing comprise instructions for replacing, in the import address table, an address associated with the identified function with an address to be used to access a proxy function provided by a proxy module.

10. The media of claim 8, having further instructions for:

loading the proxy module into operational memory;

identifying the address to be used to access the function provided by the proxy module;

identifying in the import address table a function to which calls from the application are to be intercepted; and wherein the instructions for replacing comprise instructions for replacing, in the import address table, an address associated with the identified function with the identified address to be used to access the function provided by the proxy module.

11. Computer readable media having instructions for:

loading an application in debugging mode;

detecting when the application's import address table has been updated to include addresses for functions provided by the slave module and then pausing the execution of the application module;

replacing an address in the import address table used to access a function provided by a slave module with an address to be used to access a proxy function provided by a proxy module; and resuming execution of the application after the address for the function provided by the slave module has been replaced.

12. The media of claim 11, wherein the instructions for loading, detecting, and pausing comprise instructions for loading the application in debugging mode with an option selected to automatically pause the execution of the application once the import address table includes addresses for functions provided by the slave module.

13. The media of claim 11, having further instructions for:

loading the proxy module into the memory space of the application;

identifying the address to be used to access the proxy function provided by the loaded proxy module;

identifying in the import address table a function to which calls from the application are to be intercepted; and wherein the instructions for replacing comprise instructions for replacing, in the import address table, an address associated with the identified function with the identified address to be used to access the function provided by the proxy module.

14. The media of claim 13, wherein the instructions for loading the proxy module comprise instructions for:

loading a bootstrap code into the memory space of the application; and, replacing, in the import address table, an address used to access a function called early in the execution of the application with an address used to access the bootstrap code;

wherein the bootstrap code includes instructions for loading the proxy module into the memory space of the application and to make a call to the function called early in the execution of the application.

15. A system for intercepting a function call made by an application, comprising:

a module loader operable to load a proxy module into operational memory with an application;

bootstrap code;

a hooking module operable to load the bootstrap code into the memory space of the application, access an import address table for the application, replace, in the import address table, an address used to access a function called early in the execution of the application with an address used to access the bootstrap code;

a reviser operable to identify an address to be used to access a proxy function provided by the proxy module, access the import address table for the application, identify in the import address table a function to which calls from the application are to be intercepted, and replace, in the import address table, an address associated with the identified function with the identified address to be used to access the function provided by the proxy module;

wherein the bootstrap code includes instructions for loading the proxy module into the memory space of the application and to make a call to the function called early in the execution of the application and wherein the module loader, the bootstrap code, the hooking module, and the reviser are stored on one or more computer readable media.

16. A system for intercepting a function call made by an application, comprising:

an application loader operable to load an application in debugging mode;

an event detector operable to detect when the application's import address table includes an address for a function provided by a slave module;

an execution controller operable to pause the execution of the application upon detection by the event detector and to later resume execution of the application; and a reviser operable to accessing the import address table of the application when paused and replace an address in the import address table used to access a function provided by the slave module with an address to be used to access a proxy function provided by a proxy module;

wherein the application loader, the event detector, the execution controller, and the reviser are stored on one or more computer readable media.

17. The system of claim 16, further comprising a module loader operable to load the proxy module into memory with the application, and wherein the reviser is further operable to identify an address to be used to access a proxy function provided by the proxy module once loaded and to and replace an address in the import address table used to access a function provided by the slave module with the identified address to be used to access the proxy function.

* * * * *

UNITED STATES PATENT AND TRADEMARK OFFICE

CERTIFICATE OF CORRECTION

PATENT NO. : 7,353,507 B2
APPLICATION NO. : 10/283695
DATED : April 1, 2008
INVENTOR(S) : Charles J. Gazdik et al.

It is certified that error appears in the above-identified patent and that said Letters Patent is hereby corrected as shown below:

Title Pg, Item (54), in "Title", delete "CELLS" and insert -- CALLS --, therefor.

In column 1, line 1, delete "CELLS" and insert -- CALLS --, therefor.

In column 9, line 32, in Claim 11, after "application" delete "module".

Signed and Sealed this

Eleventh Day of August, 2009

David J. Kappos

David J. Kappos
*Director of the United States Patent and Trademark Office*